United States Patent
Jin et al.

(10) Patent No.: US 9,491,510 B2
(45) Date of Patent: Nov. 8, 2016

(54) METHODS AND SYSTEMS FOR STREAM MANAGEMENT FOR A DIGITAL VIDEO RECORDING DEVICE

(71) Applicant: Verizon Patent and Licensing Inc., Arlington, VA (US)

(72) Inventors: Zhiying Jin, Lexington, MA (US); Yuhui Qian, Lexington, MA (US); Xuefeng Yao, Weston, MA (US)

(73) Assignee: VERIZON PATENT AND LISENSING INC., Basking Ridge, NJ (US)

( * ) Notice: Subject to any disclaimer, the term of this patent is extended or adjusted under 35 U.S.C. 154(b) by 77 days.

(21) Appl. No.: 14/656,168

(22) Filed: Mar. 12, 2015

(65) Prior Publication Data
US 2016/0269779 A1    Sep. 15, 2016

(51) Int. Cl.
*H04N 5/76*    (2006.01)
*H04N 21/458*    (2011.01)

(52) U.S. Cl.
CPC ............................. *H04N 21/4583* (2013.01)

(58) Field of Classification Search
USPC ................................................ 386/291–299
See application file for complete search history.

(56) References Cited

U.S. PATENT DOCUMENTS 8,738,414 B1 * 5/2014 Nagar ................. G06Q 10/101
   705/7.12
8,965,860 B2 * 2/2015 Cheenath ............ G06F 17/3038
   707/703

* cited by examiner

*Primary Examiner* — Nigar Chowdhury

(57) ABSTRACT

An exemplary method includes a stream management system that detects a request for any device included in a media processing system to receive a media stream provided by a television service. In response, the stream management system determines that a digital video recording ("DVR") device included in the media processing system is already receiving and recording a maximum number of media streams that the DVR device is allowed to concurrently record. In response to this determination, the stream management system performs a status check with respect to the media streams being received and recorded by the DVR device in order to determine whether one of the media streams may be dropped by the DVR device so that the DVR device can instead receive and record the media stream identified in the request. Corresponding systems and methods are also described.

18 Claims, 7 Drawing Sheets

US 9,491,510 B2

METHODS AND SYSTEMS FOR STREAM MANAGEMENT FOR A DIGITAL VIDEO RECORDING DEVICE

BACKGROUND INFORMATION

Internet Protocol television ("IPTV") service providers deliver television content to end users over the Internet, as opposed to terrestrial, satellite, and/or cable networks used by conventional television service providers. IPTV allows for integration of television with other IP-based services (e.g., high speed Internet access and voice over IP ("VOIP") telephone services), provides opportunities to make television content interactive and personalized, and can be more economical for television service providers than conventional television delivery platforms.

To facilitate access by an end user to television content provided by an IPTV service provider, the end user may be provided with an in-home IPTV processing system, which may include an IP-based set-top box device for each television in the end user's home and an IP-based digital video recording ("DVR") device. The set-top box devices may be configured to receive IPTV streams that include television content provided by the IPTV service provider and present the television content by way of the televisions. The DVR device may be configured to automatically receive and record IPTV streams received by any of the set-top box devices in order to provide DVR functionality for the set-top boxes. In this manner, each set-top box device does not have to include its own DVR capabilities (e.g., storage space, etc.).

A DVR device included in an in-home IPTV processing system associated with an end user may be limited, either by hardware limitations of the DVR device or by a subscription plan associated with the end user, to concurrently receiving and recording a predetermined maximum number of IPTV streams. For example, an exemplary DVR device may only receive and record up to twelve IPTV streams at any given time. Because the DVR device may continue receiving and recording an IPTV stream received by a set-top box device even after the set-top box device switches to a different IPTV stream (e.g., so that the end user may later switch back to the first IPTV stream and watch the first IPTV stream in a time-shifted manner), the DVR device may quickly reach the maximum number of IPTV streams that it is allowed to concurrently receive and record.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
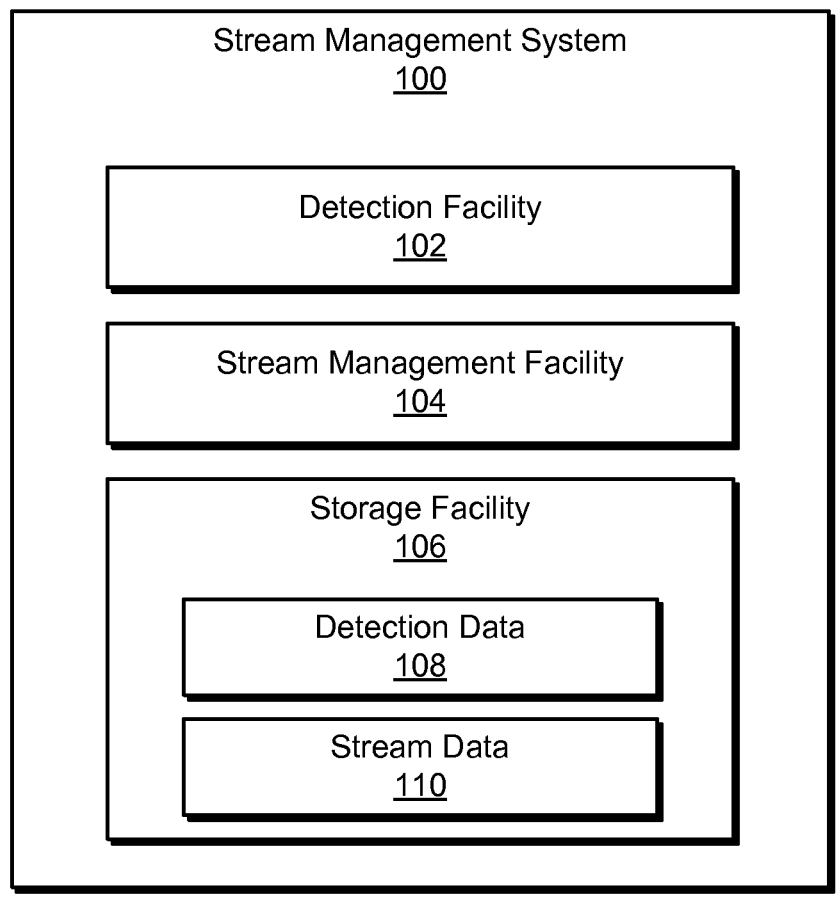
FIG. 1 illustrates an exemplary stream management system according to principles described herein.

Methods and systems for stream management for a DVR device are described herein. As will be illustrated below, the DVR device may be included in a media processing system (e.g., an IPTV processing system) that also includes a plurality of media player devices (e.g., set-top box devices) configured to facilitate access by a user to media content provided by a television service. The DVR device may be configured to automatically receive and record media streams (e.g., IPTV streams) received by any of the media player devices. The methods and systems described herein may facilitate efficient stream management for the DVR device while minimizing any detrimental impact that dropping media streams being recorded by the DVR device may have on users of the media processing system.

In some embodiments, a stream management system may detect a request for any device included in the media processing system to receive a media stream provided by the television service. In response to the request, the stream management system may determine that the DVR device is already receiving and recording a plurality of media streams provided by the television service when the request is detected and that a total number of media streams included in the plurality of media streams is equal to a maximum number of media streams that the DVR device is allowed to concurrently record. In response to this determination, the stream management system may perform a status check with respect to the plurality of media streams being received and recorded by the DVR device in order to determine whether one of the media streams may be dropped by the DVR device so that the DVR device can instead receive and record the media stream identified in the request. During the status check, the stream management system may determine whether each media stream included in the plurality of media streams is an active tune-in stream, an inactive tune-in stream, or a recording stream.

As used herein, an "active tune-in stream" refers to a media stream that is being received and presented by one of the media player devices when the request is detected and without a user input command being provided for the DVR device to record a media program included in the media stream. For example, an active tune-in stream may refer to a media stream that is received by a media player device in response to a user simply directing the media player device to tune to a content channel associated with the media stream and that is presented by way of a television that is in an "on state" such that media content included in the media stream is being displayed by the television when the request is detected.

As used herein, an "inactive tune-in stream" refers to a media stream that is no longer being presented by any of the media player devices when the request is detected, but that was being presented prior to the request by one of the media player devices without a user input command being provided for the DVR device to record a media program included in the inactive tune-in stream. For example, an inactive tune-in stream may refer to a media stream that was received and presented by a media player device prior to the request being detected, but that is no longer being presented by the media player device when the request is detected (e.g., because a television connected to the media player device is in an "off state" when the request is detected or because the media player device switched to a different media stream before the request is detected).

It will be recognized that media streams designated as being either active or inactive tune-in streams are received and recorded by the DVR device without a user specifically requesting that a media program included in the media streams be recorded by the DVR device. In contrast, a "recording stream" refers to a media stream that is being received and recorded by the DVR device when the request is detected and in response to a user input command being provided for the DVR device to record a media program included in the recording stream. For example, a user may provide a user input command for the DVR device to record a televised basketball game. The media stream that includes the televised basketball game may be designated as being a recording stream if the televised basketball game is being recorded when the request is detected.

Based on the status check and on a priority-based selection heuristic, the stream management system may select a particular media stream included in the plurality of media streams being received and recorded by the DVR device when the request is detected to be dropped by the DVR device so that the DVR device may receive and record the media stream that is the subject of the request in place of the dropped media stream. As used herein, a DVR device may "drop" a media stream by ceasing to receive and record the media stream. Various ways in which the stream management system may determine which media stream to drop will be described herein.

FIG. 1 illustrates an exemplary stream management system 100 ("system 100"). As shown, system 100 may include, without limitation, a detection facility 102, a stream management facility 104 ("management facility 104"), and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations. Facilities 102-106 of system 100 may include or be otherwise implemented by one or more computing devices specifically configured to perform one or more of the operations described herein. In such implementations, system 100 may be referred to as a computer-implemented system 100.

Storage facility 106 may store detection data 108 generated and/or used by detection facility 102 and stream data 110 generated and/or used by management facility 104. Storage facility 106 may store additional or alternative data as may serve a particular implementation.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by detection facility 102 and/or management facility 104. In certain examples, data generated by detection facility 102 and/or management facility 104 may be stored permanently or temporarily to storage facility 106.

Detection facility 102 may detect a request for any device included in a media processing system to receive a media stream provided by a television service. The media stream may include any type of media stream that includes media content (e.g., subscription television content and/or media-on-demand content) accessible by way of the television service. The television service may include any television-based service that provides end users of the service with one or more features and/or tools configured to facilitate user discovery, access, and/or consumption of media content. In some examples, the television service may include an IPTV service that provides IPTV streams to the media processing system. The television service may alternatively include any other type of television service as may serve a particular implementation.

Detection facility 102 may detect the request for any device included in the media processing system to receive the media stream provided by the television service in any suitable manner. For example, detection facility 102 may detect a request provided by a user for a media player device to tune to (i.e., switch to) a content channel that is associated with the media stream and begin presenting media content included in the media stream (e.g., by displaying the media content on a display screen (e.g., a television) connected to the media player device).

As another example, detection facility 102 may detect the request for any device included in the media processing system to receive the media stream provided by the television service by detecting a request for the DVR device to record a media program included in the media stream. The request may be alternatively detected in any suitable manner.

In some examples, the request may be temporally aligned with when a media player device and/or a DVR device included in the media processing system is supposed to begin receiving the media stream. For example, a user may provide user input representative of a command for the DVR device to begin receiving and recording a media stream at a particular point in time subsequent to when the user input command is provided. In this scenario, the request as detected by detection facility 102 occurs when the DVR device is to begin receiving and recording the media stream (and not when the user input is provided).

Management facility 104 may perform various stream management operations with respect to media streams received by a media processing system. For example, in response to the request detected by detection facility 102, management facility 104 may determine that the DVR device is already receiving and recording a plurality of media streams provided by the television service when the request is detected and that a total number of media streams included in the plurality of media streams is equal to a maximum number of media streams that the DVR device is allowed to concurrently record. The maximum number of media streams that the DVR device is allowed to concurrently record may be dependent on hardware and/or software limitations of the DVR device (e.g., the DVR device may be technologically capable of concurrently receiving and recording up to a certain maximum number of media streams), a subscription plan associated with a user of the DVR device, and/or any other factor as may serve a particular implementation. An exemplary, but not exclusive, maximum number of media streams that the DVR device may concurrently receive and record is twelve.

In response to determining that the DVR device is already receiving and recording a plurality of media streams provided by the television service when the request is detected and that a total number of media streams included in the plurality of media streams is equal to a maximum number of media streams that the DVR device is allowed to concurrently record, management facility 104 may perform a status check with respect to the plurality of media streams being received and recorded by the DVR device in order to determine whether one of the media streams may be dropped by the DVR device so that the DVR device can instead receive and record the media stream identified in the request. Based on the status check and on a priority-based selection heuristic, management facility 104 may select a particular media stream included in the plurality of media streams being received and recorded by the DVR device when the request is detected to be dropped by the DVR device so that the DVR device may receive and record the media stream that is the subject of the request in place of the dropped media stream. Examples of this will be provided in more detail below.

Figure 2:
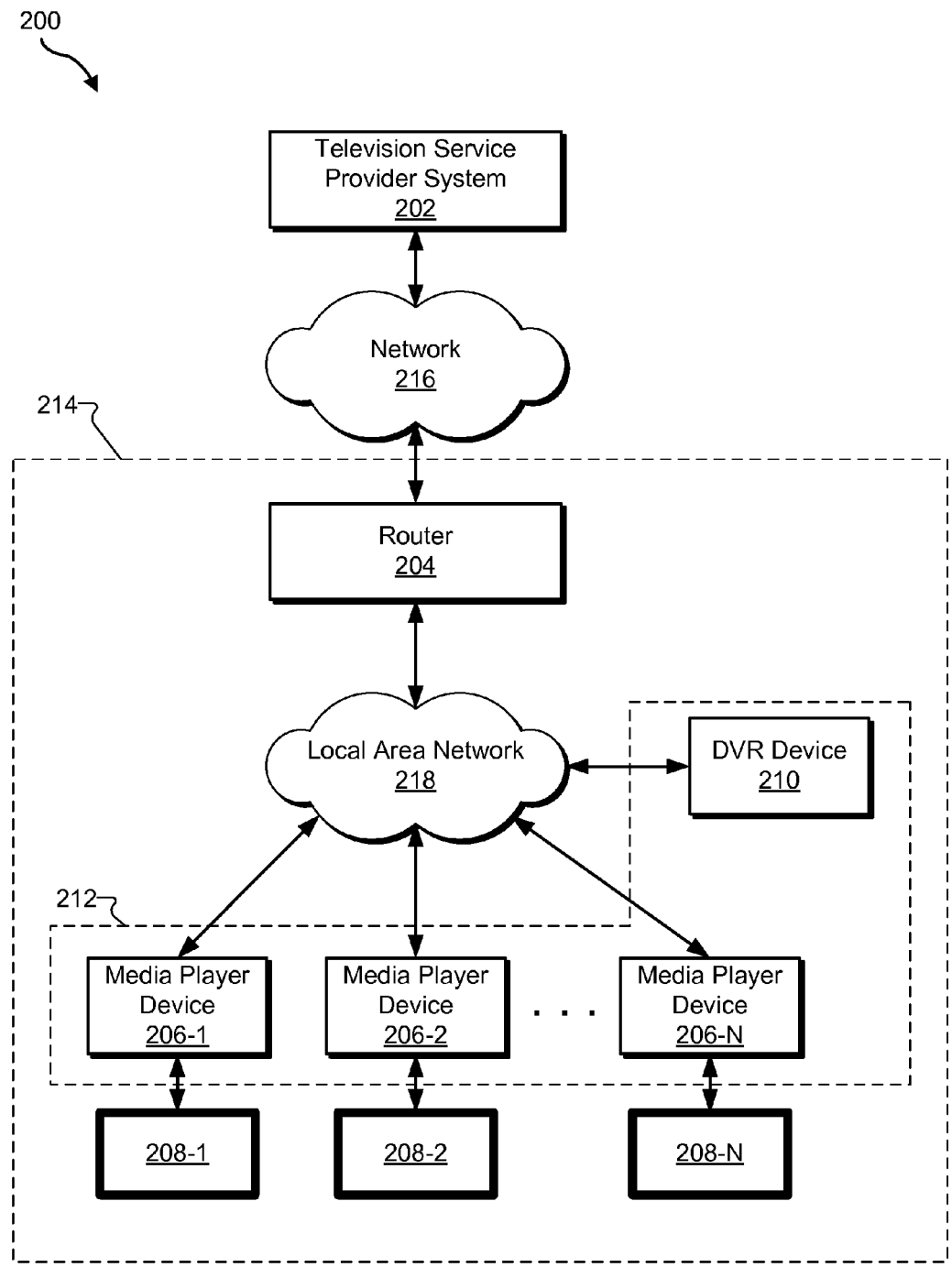
FIG. 2 shows an exemplary implementation of the system of FIG. 1 according to principles described herein.

FIG. 2 shows an exemplary implementation 200 of system 100. As shown, implementation 200 may include a television service provider system 202, a router 204, a plurality of media player devices 206 (e.g., media player devices 206-1 through 206-N) each connected to a display screen 208 (e.g., display screens 208-1 through 208-N), and a DVR device 210. As shown, media player devices 206 and DVR device 210 may be included in a media processing system 212, which may be located within a user premises 214 (e.g., a home, business, or other geographic area) associated with a user. As also shown, router 204 and display screens 208 may also be located within user premises 214.

In implementation 200, one or more of facilities 102-106 of system 100 may be implemented entirely by television service provider system 202, entirely by DVR device 210, or distributed across television service provider system 202, media player devices 206, and/or DVR device 210 in any manner. System 100 may alternatively be at least partially implemented by one or more computing devices or systems not shown in FIG. 2. For example, system 100 may be at least partially implemented by a computing system maintained by a third-party entity other than a television service provider associated with television service provider system 202.

Television service provider system 202 may communicate with (e.g., transmit media streams to) devices within media processing system 202 by way of a network 216, router 204, and local area network 218. Network 216 may include one or more wide area networks (e.g., the Internet), wireless communication networks, mobile telephone networks (e.g., cellular telephone networks), closed media networks, open media networks, subscriber television networks, and/or any other networks capable of carrying data (e.g., media streams) and/or communications signals between television service provider system 202 and media processing system 212.

Local area network 218 may include any suitable network that connects network-enabled devices within user premises 214. For example, local area network 218 may include a wired and/or wireless network provided by router 204.

Television service provider system 202, router 204, media player devices 206, and DVR device 210 may communicate using any communication platforms and technologies suitable for transporting data (e.g., media streams) and/or communication signals, including known communication technologies, devices, media, and protocols supportive of remote communications, examples of which include, but are not limited to, data transmission media, communications devices, Internet Protocol ("IP"), Transmission Control Protocol ("TCP"), User Datagram Protocol ("UDP"), Hypertext Transfer Protocol ("HTTP"), Hypertext Transfer Protocol Secure ("HTTPS"), Real-Time Transport Protocol ("RTP"), Session Initiation Protocol ("SIP"), Simple Object Access Protocol ("SOAP"), Extensible Mark-up Language ("XML") and variations thereof, radio frequency ("RF") signaling technologies, Code Division Multiple Access ("CDMA") technologies, Global System for Mobile Communications ("GSM") technologies, Time Division Multiple Access ("TDMA") technologies, Short Message Service ("SMS"), Multimedia Message Service ("MMS"), wireless communication technologies, Internet communication technologies, media streaming technologies, media download technologies, and other suitable communications technologies.

Television service provider system 202 may be configured to provide a television service for access by one or more users (e.g., a user associated with user premises 214). The television service may include a subscription television service and/or any other television service that provides access to television programming. For example, television service provider system 202 may transmit media streams (e.g., IPTV streams) to media processing system 212 by way of network 216. Television service provider system 202 may be associated with (e.g., maintained and/or provided by) a television service provider.

Router 204 may include any suitable router that may be located within user premises 214 and distribute media streams provided by television service provider system 202 to media player devices 206 and DVR device 210. Router 204 may include, for example, a broadband home router configured to receive IPTV streams from television service provider system 202 via network 216 and distribute the IPTV streams to media player devices 206 and DVR device 210 via local area network 218.

Media player devices 206 may each include one or more computing devices configured to receive a media stream and present the media stream by displaying media content included in the media stream on a display screen 208. For example, a media player device 206 may include a set-top box device, a computer, a tablet computer, a smart phone device, a gaming console, and/or any other type of computing device capable of receiving and presenting media streams. In some examples, media player devices 206 are IP-based (i.e., they may be configured to receive and present IPTV streams). As will be described below, a media player device 206 may not have its own DVR storage capabilities.

Display screens 208 may be configured to display media content included in media streams received and processed by media player devices 206. For example, display screen 208-1 may display media content included in a media stream received and processed by media player device 206-1. A display screen 208 may be separate from and connected to its corresponding media player device 206. For example, a display screen 208 may include a television or a computer monitor separate from and connected to a set-top box device. Alternatively, a display screen 208 may be integrated into its corresponding media player device 206. For example, a display screen 208 may include a screen that is a part of a tablet computer.

DVR device 210 may include any suitable combination of computing devices configured to receive and record media streams received by any of the devices included in media processing system 212. In this manner, DVR device 210 may provide DVR functionality to media player devices 206, even if media player devices 206 do not have their own DVR storage capabilities. For example, a user of media player device 206-1 may provide a request for media player device 206-1 to play back a media program recorded by DVR device 210. In response to the request, system 100 may direct DVR device 210 to transmit a media stream that includes the recorded media program to media player device 206-1 for playback by media player device 206-1.

As shown, DVR device 210 is directly connected to local area network 218. In this configuration, DVR device 210 may be referred to as a local DVR device. In some alternative examples, DVR device 210 may be located outside user premises 214 and configured to communicate with media player devices 206 by way of network 216. In this configuration, DVR device 210 may be referred to as a remote DVR device, a network DVR device, or a cloud DVR device.

In some examples, DVR device 210 may continue receiving and recording a media stream even after a media player device (e.g., media player device 206-1) that initially requested and began receiving the media stream stops presenting the media stream. A media player device may stop presenting a media stream by switching to a different media stream or by ceasing to display media content included in the media stream by way of a display screen (e.g., when the display screen is turned off). By continuing to receive and record the media stream, DVR device 210 may facilitate subsequent playback of the media stream by a user of any one of the media player devices 206.

Figure 3:
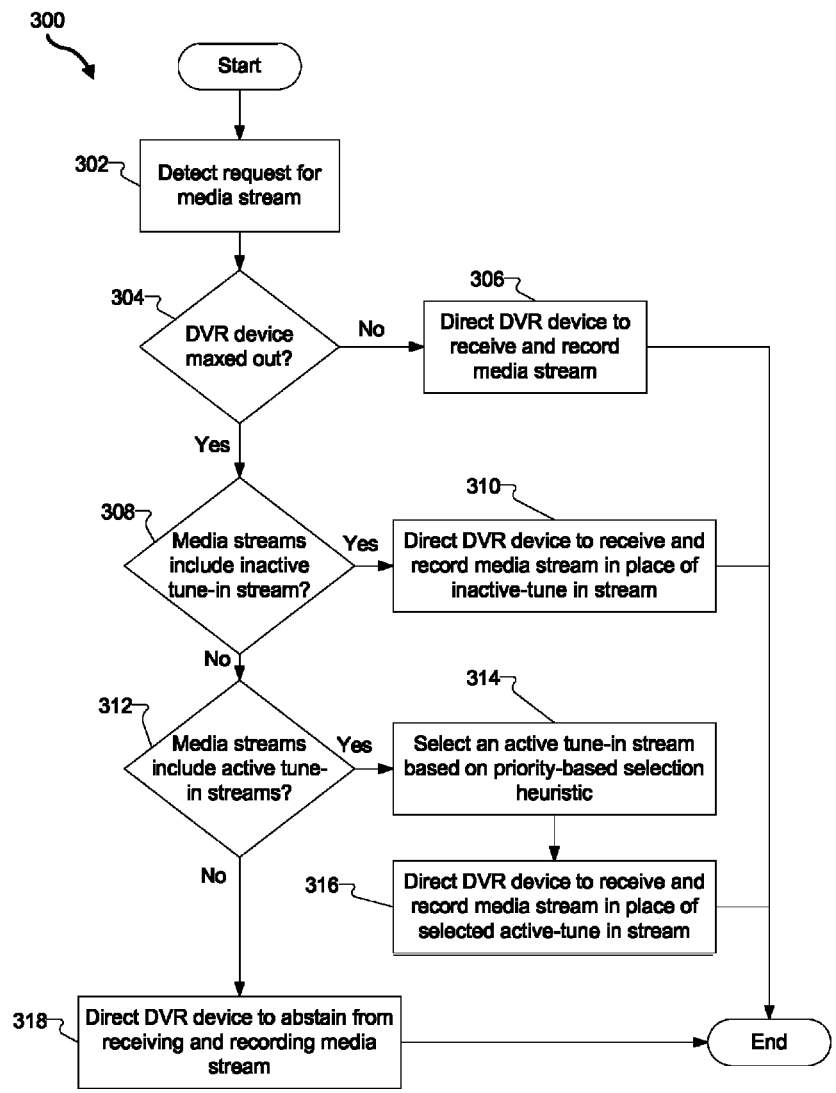
FIG. 3 shows a flow chart that illustrates an exemplary priority-based selection heuristic according to principles described herein.

FIG. 3 shows a flow chart 300 that illustrates an exemplary priority-based selection heuristic that may be used to select a media stream included in a plurality of media streams being received and recorded by a DVR device (e.g., DVR device 210) that is to be dropped by the DVR device so that the DVR device may receive and record a different media stream in place of the dropped media stream. While FIG. 3 illustrates exemplary steps according to one embodiment, other embodiments may omit, add to, reorder, and/or modify any of the steps shown in FIG. 3. One or more of the steps shown in FIG. 3 may be performed by system 100 and/or any implementation thereof.

In step 302, system 100 detects a request for any device included in a media processing system (e.g., media processing system 212) to receive a media stream provided by a television service. The request may be detected in any of the ways described herein.

In decision block 304, system 100 determines whether a DVR device (e.g., DVR device 210) included in the media processing system is already receiving and recording a maximum number of media streams that the DVR device is allowed to concurrently record. For example, system 100 may count the total number of media streams that the DVR device is recording when the request is detected and determine that the total number is equal to the maximum number of media streams that the DVR device is allowed to concurrently record.

If the DVR device is not receiving and recording the maximum number of media streams when the request is detected (No; decision block 304), system 100 may direct the DVR device to receive and record the media stream that is the subject of the request (step 306).

However, if the DVR device is receiving and recording the maximum number of media streams when the request is detected (Yes; decision block 304), system 100 determines whether the plurality of media streams being received and recorded by the DVR device includes an inactive tune-in stream (decision block 308). This decision may be based on a status check performed by system 100 with respect to the plurality of media streams.

As described above, an inactive tune-in stream refers to a media stream that is no longer being presented by any of the media player devices (e.g., media player devices 206) included in the media processing system when the request is detected but that was being presented prior to the request by one of the media player devices without a user input command being provided for the DVR device to record a media program included in the inactive tune-in stream. To illustrate, at some point in time prior to the request being detected in step 302, a user may direct media player device 206-1 to tune to a first media stream (e.g., by providing an input command representative of a "channel up" command). In response, media player device 206-1 may begin receiving the first media stream and presenting the first media stream by way of display screen 208-1. DVR device 210 may concurrently and automatically begin receiving and recording the first media stream. However, the user may subsequently (but still before the request is detected in step 302) either direct the media player device 206-1 to tune to a second media stream in place of the first media stream or turn off the display screen 208-1. In either case, DVR device 210 continues receiving and recording the first media stream and is doing so when the request is detected in step 302. However, because media player device 206-1 is no longer presenting the first media stream when the request is detected in step 302, system 100 may designate the first media stream as an inactive tune-in stream.

As shown in step 310, if the plurality of media streams being received and recorded by the DVR device when the request is detected includes an inactive tune-in stream (Yes, decision block 308), system 100 may direct the DVR device to drop the inactive tune-in stream and receive and record the media stream that is the subject of the request in place of the inactive tune-in stream.

In some cases, there may be multiple inactive tune-in streams included in the plurality of media streams being received and recorded by the DVR device when the request is detected. In these cases, system 100 may select one of the inactive tune-in streams to be dropped by the DVR device in any suitable manner.

For example, system 100 may identify an inactive tune-in stream included in the plurality of inactive tune-in streams that has been inactive for more time than a remaining number of inactive tune-in streams included in the plurality of inactive tune-in streams and designate the identified inactive tune-in stream as the inactive tune-in stream that is to be dropped by the DVR device. By dropping the inactive tune-in stream that has been inactive for the most time compared to the other inactive tune-in streams, system 100 may minimize the risk of dropping a media stream that a user of the media processing system is likely to want to playback in the future.

Additionally or alternatively, system 100 may determine which inactive tune-in stream to drop by identifying an inactive tune-in stream included in the plurality of inactive tune-in streams and that has been inactive for more than a predetermined amount of time (e.g., five days), and designating the identified inactive tune-in stream as the inactive tune-in stream that is to be dropped by the DVR device. By dropping an inactive tune-in stream that has been inactive for a relatively long period of time, system 100 may minimize the risk of dropping a media stream that a user of the media processing system is likely to want to play back in the future.

Additionally or alternatively, system 100 may determine which inactive tune-in stream to drop by identifying an inactive tune-in stream included in the plurality of inactive tune-in streams that was tuned to by a media player device for the least amount of time compared to the other inactive tune-in streams and designating the identified inactive tune-in stream as the inactive tune-in stream that is to be dropped by the DVR device. For example, a user may direct a media player device to tune to a first media stream and realize that he or she does not like the media content included in the first media stream. As a result, the user may quickly direct the media player device to tune to a second media stream. Based on the relatively short amount of time that the media player device is tuned to the first media stream, it may be inferred that the user is not interested in the first media stream. Hence, the first media stream may be dropped without negatively impacting the user.

Additionally or alternatively, system 100 may determine which inactive tune-in stream to drop by determining an identity of a user that provides the request that is detected in step 302. Based on the determined user identity, system 100 may identify an inactive tune-in stream included in the plurality of inactive tune-in streams and that is least likely of interest to the user and designate the identified inactive tune-in stream as the inactive tune-in that is to be dropped by the DVR device.

System 100 may determine an identity of the user in any suitable manner. For example, system 100 may detect that a mobile device is located within the vicinity of the media player device and/or display screen when user provides the request that is detected in step 302, identify a user profile associated with the mobile device, and use the user profile to determine the identity of the user.

Figure 4:
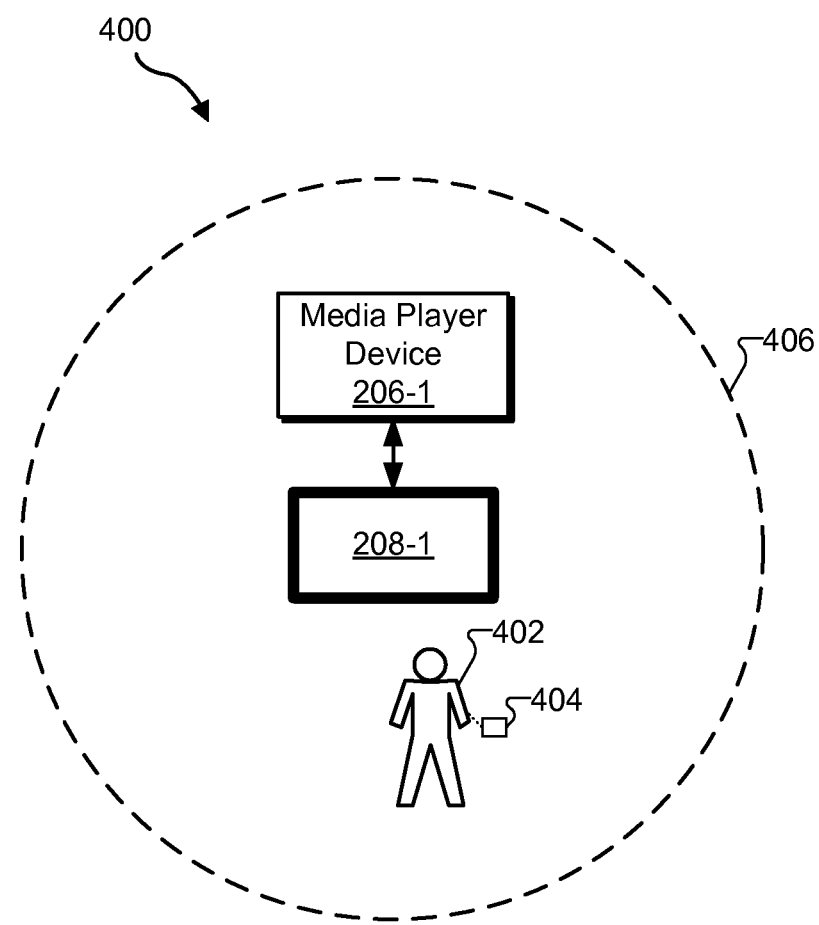
FIG. 4 illustrates an exemplary scenario in which a user carries a mobile device into a vicinity of a media content processing device and a display screen according to principles described herein.

To illustrate, FIG. 4 illustrates an exemplary scenario 400 in which a user 402 carries a mobile device 404 into a vicinity 406 of media player device 206-1 and display screen 208-1. Mobile device 404 may include a tablet computer, a mobile phone, and/or any other mobile computing device as may serve a particular implementation. Vicinity 406 may include a user-defined geographic area, a network footprint (e.g., a vicinity defined by a wireless range of router 204), and/or any other suitable area as may serve a particular implementation. As such, system 100 may detect that mobile device 404 is within vicinity 406 in any suitable manner. For example, system 100 may use global positioning system ("GPS") data to determine that mobile device 404 is located within a geographic vicinity of media player device 206-1 and/or display screen 208-1. As another example, system 100 may determine that mobile device 404 is located within vicinity 406 by determining that mobile device 404 is connected to the same local area network 218 as media player device 206-1.

In response to determining that mobile device 404 is within vicinity 406, system 100 may identify a user profile associated with mobile device 404. This may be done in any suitable manner. For example, system 100 may detect an identifier of mobile device 404 and query a database of mobile device records (e.g., records maintained by a wireless service provider) for the identifier in order to identify a user profile associated with mobile device 404. The user profile may then be used to determine the identity of user 402 (e.g., by accessing the same mobile device records).

System 100 may additionally or alternatively determine identity of the user by determining that the request detected in step 302 is provided by way of a mobile device, identifying a user profile associated with the mobile device, and using the user profile to determine the identity of the user.

To illustrate, a user may use a remote control application on his or her mobile phone to provide the request that is detected in step 302. System 100 may detect that the remote control application is being used to provide the input command, and, in response, identify a user profile associated with the mobile device. For example, system 100 may identify a user account logged in to the remote control application and/or into any other application being executed by the mobile phone. The user account may then be used to determine the identity of the user.

As another example, system 100 may determine the identity of the user by acquiring biometric data associated with the user and using the biometric data to determine the identity of the user. For example, system 100 may use one or more sensors, cameras, and/or other devices to acquire facial recognition data, fingerprint data, voice recognition data, and/or any other type of biometric data associated with the user. The acquired biometric data may be used in any suitable way to determine the identity of the user.

As another example, system 100 may determine the identity of the user by identifying a user account that is currently logged in to the media player device and/or the television service when the request is detected in step 302.

System 100 may use the identity of the user to identify an inactive tune-in stream that is least likely of interest to the user in any suitable manner. For example, system 100 may use the identity of the user to access a viewing history associated with the user and determine that the user historically watches sporting events. System 100 may accordingly identify an inactive tune-in stream that is unrelated to sports (e.g., by analyzing metadata, closed captioning data, images, and/or other data associated with the inactive tune-in stream and comparing the analyzed data to data associated with sports) and designate the identified inactive tune-in stream as being least likely of interest to the user.

System 100 may additionally or alternatively determine which inactive tune-in stream to drop by determining that the request detected in step 302 is for a particular media player device (e.g., media player device 206-1) to receive the media stream that is the subject of the request, identifying an inactive tune-in stream that was received by a different media player device (e.g., media player device 206-2) included in the plurality of media player devices, and designating the identified inactive tune-in stream as the inactive tune-in stream that is to be dropped by the DVR device. By selecting an inactive tune-in stream that was received by a different media player device than the media player device that the user is currently using, system 100 may minimize the chance that the user is interested in the selected inactive tune-in stream.

System 100 may additionally or alternatively determine which inactive tune-in stream to drop by identifying an inactive tune-in stream that includes less advertisement content than a remaining number of inactive tune-in streams included in the plurality of inactive tune-in streams and designating the identified inactive tune-in stream as the inactive tune-in stream that is to be dropped by the DVR device. By not dropping inactive tune-in streams that have a relatively high amount of advertisement content, the television service provider may maximize revenue generated from advertisement content providers, which may result in lower costs (e.g., subscription fees) for end users of the television service.

System 100 may determine that a particular inactive tune-in stream has less advertisement content than another inactive tune-in stream in any suitable manner. For example, system 100 may analyze metadata, closed captioning data, signaling data that indicates start and stop times of advertisement breaks, and/or any other data include within or otherwise associated with inactive tune-in streams in order to determine which inactive tune-in stream has the least amount of advertisement content.

Once system 100 selects an inactive tune-in stream from a plurality of inactive tune-in streams in any of the ways described above, system 100 may direct the DVR device to drop the selected inactive tune-in stream and receive and record the media stream that is the subject of the request detected in step 302. This may be performed in any of the ways described herein.

Returning to FIG. 3, if system 100 determines that the plurality of media streams being received and recorded when the request is detected in step 302 does not include any inactive tune-in streams (No; decision block 308), system 100 may determine whether the plurality of media streams includes any active tune-in streams (decision block 312).

As described above, an active tune-in stream refers to a media stream that is being received and presented by one of the media player devices when the request is detected and without a user input command being provided for the DVR device to record a media program included in the media stream. For example, at some point in time prior to the request being detected in step 302, a user may direct media player device 206-1 to tune to and present a media stream. In response, media player device 206-1 may begin receiving the media stream and presenting the media stream by way of display screen 208-1. DVR device 210 may concurrently and automatically begin receiving and recording the media stream. If media player device 206-1 is still presenting the media stream when the request is detected in step 302, system 100 may designate the media stream as an active tune-in stream.

If system 100 determines that the plurality of media streams includes one or more active tune-in streams (Yes; decision block 312), system 100 may select one of the one or more active tune-in streams based on the priority-based selection heuristic (step 314) and direct the DVR device to drop the selected active tune-in stream and receive and record the media stream that is the subject of the request received in step 302 in place of the selected active tune-in stream (step 316).

To illustrate, if system 100 determines that the plurality of media streams includes only one active tune-in stream, that active tune-in stream may be designated as the active tune-in stream that is to be dropped by the DVR device.

However, if system 100 determines that the plurality of media streams includes a plurality of active tune-in streams, system 100 may select one of the active tune-in streams to be dropped by the DVR device in any suitable manner. For example, one or more of the same selection criteria described above in connection with the inactive tune-in streams may be applied in order to select an active tune-in stream that is to be dropped by the DVR device.

To illustrate, system 100 may determine which active tune-in stream to drop by identifying an active tune-in stream that includes less advertisement content than a remaining number of active tune-in streams included in the plurality of active tune-in streams and designating the identified active tune-in stream as the active tune-in stream that is to be dropped by the DVR device. By not dropping active tune-in streams that have a relatively high amount of advertisement content, the television service provider may maximize revenue generated from advertisement content providers, which may result in lower subscription fees for end users of the television service.

In some examples, two active tune-in streams may include the same amount of advertisement content. If the two active tune-in streams have less advertisement content than the other active tune-in streams, system 100 may select whichever active tune-in stream out of the two that has a media program that has an ending time that is closest to when the request is detected in step 302 as the active tune-in stream that is to be dropped by the DVR device.

Additionally or alternatively, system 100 may identify an active tune-in stream included in the plurality of active tune-in streams that has been active for more time than a remaining number of active tune-in streams included in the plurality of active tune-in streams and designate the identified active tune-in stream as the active tune-in stream that is to be dropped by the DVR device.

Additionally or alternatively, system 100 may determine which active tune-in stream to drop by identifying an active tune-in stream included in the plurality of active tune-in streams and that has been active for more than a predetermined amount of time (e.g., five days) and designating the identified active tune-in stream as the active tune-in stream that is to be dropped by the DVR device.

Additionally or alternatively, system 100 may determine which active tune-in stream to drop by determining an identity of a user that provides the request that is detected in step 302. Based on the determined user identity, system 100 may identify an active tune-in stream that is least likely of interest to the user and designate the identified active tune-in stream as the active tune-in stream that is to be dropped by the DVR device.

If system 100 determines that the plurality of media streams being received and recorded when the request is detected in step 302 does not include any inactive or active tune-in streams (No; decision block 312), system 100 may deduce that the plurality of media streams only includes recording streams. As described above, a recording stream refers to a media stream that is being received and recorded by the DVR device when the request is detected and in response to a user input command being provided for the DVR device to record a media program included in the recording stream.

As shown in step 318, in response to determining that the plurality of media streams only includes recording streams, system 100 may direct the DVR device to continue receiving and recording the recording streams and abstain from receiving and recording the media stream that is the subject of the request detected in step 302. In some examples, system 100 may provide a user notification that the DVR device is abstaining from receiving and recording the media stream. For example, if the request detected in step 302 includes a user input command for the DVR device to record a media program included in the media stream that is the subject of the a request, system 100 may provide a user notification that the DVR device cannot record the media program unless the user manually selects a media stream to be dropped by the DVR device. The user notification may be displayed in the form of a graphical user interface ("GUI") on a display screen connected to the media player device that the user uses to provide the request. The user notification may be alternatively provided in any other manner.

Alternatively, if the request detected in step 302 does not include a user input command for the DVR device to record a media program included in the media stream that is the subject of the a request (e.g., if the request simply includes a user input command for a media player device to tune to the media stream), system 100 may direct the DVR device to abstain from receiving and recording the media stream without notifying the user.

Figure 5:
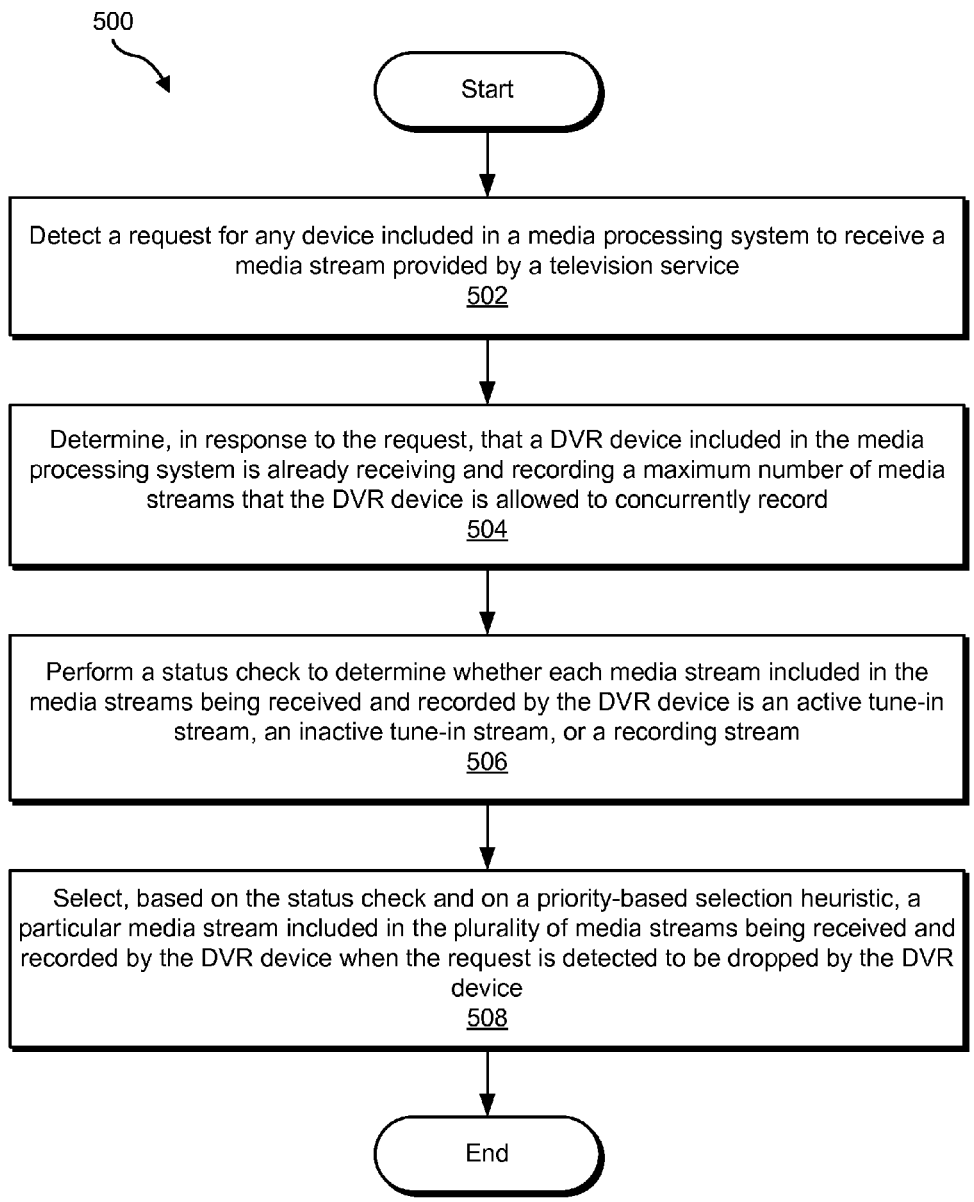
FIG. 5 illustrates an exemplary stream management method for a DVR device according to principles described herein.

FIG. 5 illustrates an exemplary stream management method 500 for a DVR device. While FIG. 5 illustrates exemplary steps according to one embodiment, other embodiments may omit, add to, reorder, and/or modify any of the steps shown in FIG. 5. One or more of the steps shown in FIG. 5 may be performed by system 100 and/or any implementation thereof.

In step 502, a stream management system detects a request for any device included in a media processing system to receive a media stream provided by a television service. As described above, the media processing system may include one or more media player devices and a DVR device configured to receive and record media streams received by the one or more media player devices. Step 502 may be performed in any of the ways described herein.

In step 504, the stream management system determines, in response to the request, that the DVR device included in the media processing system is already receiving and recording a maximum number of media streams that the DVR device is allowed to concurrently record. Step 504 may be performed in any of the ways described herein.

In step 506, the stream management system performs, in response to the determination in step 504, a status check to determine whether each media stream included in the media streams being received and recorded by the DVR device is an active tune-in stream, an inactive tune-in stream, or a recording stream. Step 506 may be performed in any of the ways described herein.

In step 508, the stream management system selects, based on the status check and on a priority-based selection heuristic, a particular media stream included in the plurality of media streams being received and recorded by the DVR device when the request is detected to be dropped by the DVR device. In this manner, the DVR device may receive and record the media stream that is the subject of the request in place of the particular media stream that is dropped. Step 508 may be performed in any of the ways described herein.

Figure 6:
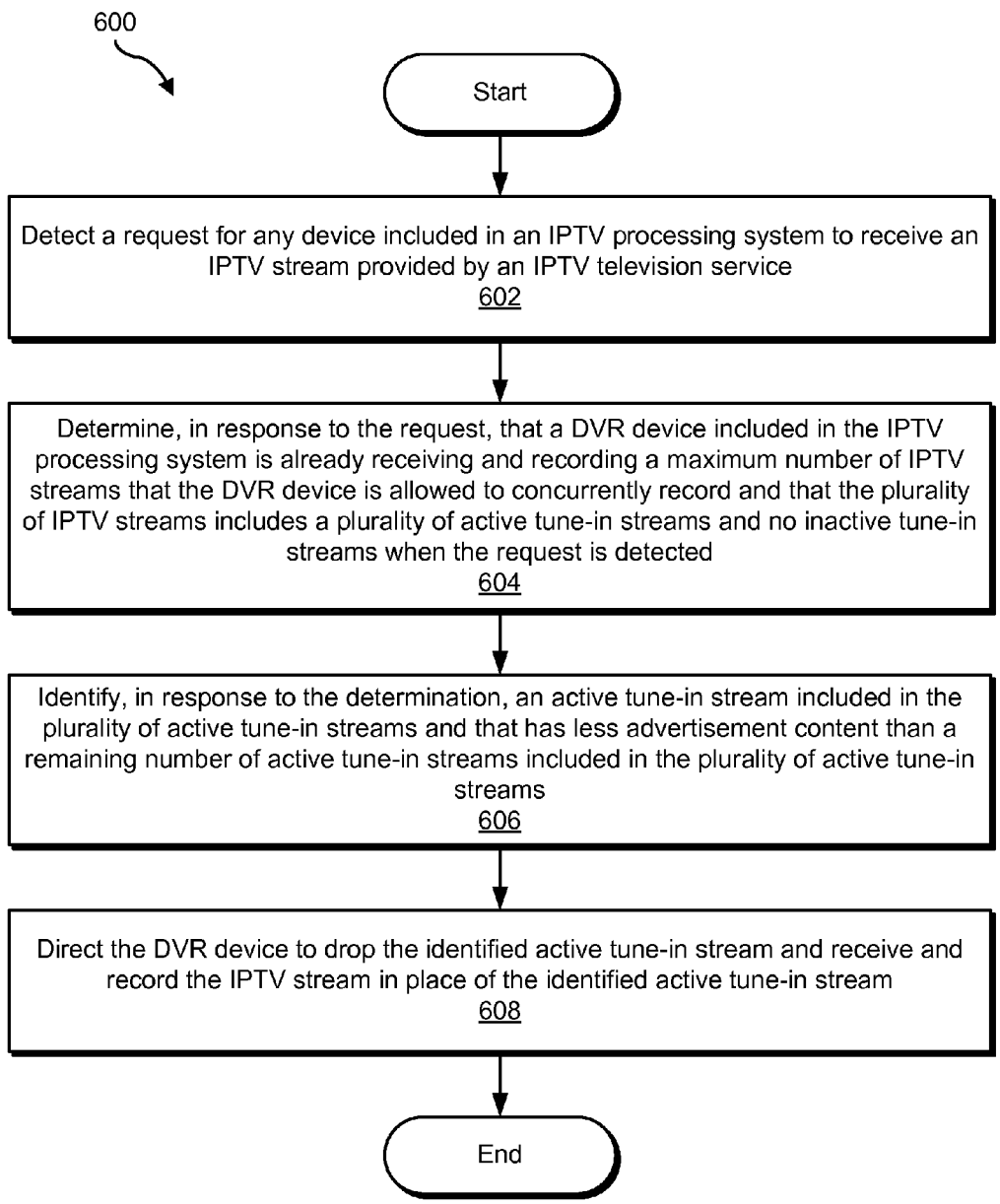
FIG. 6 illustrates another exemplary stream management method for a DVR device according to principles described herein.

FIG. 6 illustrates another exemplary stream management method 600 for a DVR device. While FIG. 6 illustrates exemplary steps according to one embodiment, other embodiments may omit, add to, reorder, and/or modify any of the steps shown in FIG. 6. One or more of the steps shown in FIG. 6 may be performed by system 100 and/or any implementation thereof.

In step 602, a stream management system detects a request for any device included in an IPTV processing system to receive an IPTV stream provided by an IPTV television service. As described above, the IPTV processing system may include a plurality of IPTV media player devices and a DVR device configured to receive and record IPTV streams received by the IPTV media player devices. Step 602 may be performed in any of the ways described herein.

In step 604, the stream management system determines, in response to the request, that the DVR device included in the IPTV processing system is already receiving and recording a maximum number of IPTV streams that the DVR device is allowed to concurrently record and that the plurality of IPTV streams includes a plurality of active tune-in streams and no inactive tune-in streams when the request is detected. Step 604 may be performed in any of the ways described herein.

In step 606, the stream management system identifies, in response to the determination in step 604, an active tune-in stream included in the plurality of active tune-in streams and that has less advertisement content than a remaining number of active tune-in streams included in the plurality of active tune-in streams. Step 606 may be performed in any of the ways described herein.

In step 608, the stream management system directs the DVR device to drop the identified active tune-in stream and receive and record the IPTV stream in place of the identified active tune-in stream. Step 608 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), erasable programmable read-only memory ("EPROM"), electrically erasable programmable read-only memory ("EEPROM"), a Flash EEPROM device, any other memory chip or cartridge, or any other tangible medium from which a computer can read.

Figure 7:
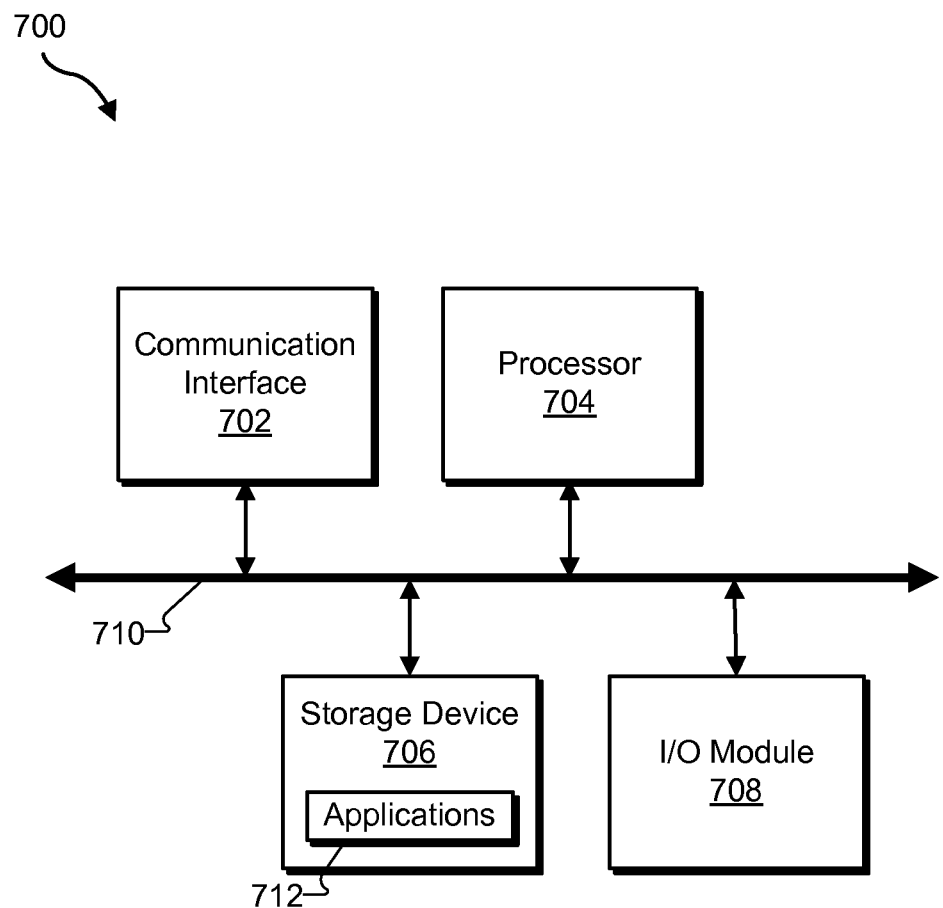
FIG. 7 illustrates an exemplary computing device according to principles described herein.

FIG. 7 illustrates an exemplary computing device 700 that may be specifically configured to perform one or more of the processes described herein. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may be configured to receive user input and provide user output and may include any hardware, firmware, software, or combination thereof supportive of input and output capabilities. For example, I/O module 708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 700. For example, one or more applications 712 residing within storage device 706 may be configured to direct processor 704 to perform one or more processes or functions associated with detection facility 102 and management facility 104. Likewise, storage facility 106 may be implemented by or within storage device 706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a stream management system, a request for any device included in a media processing system to receive a media stream provided by a television service, the media processing system comprising a plurality of media player devices and a digital video recording ("DVR") device separate from and communicatively coupled to the plurality of media player devices and configured to automatically receive and record media streams received by any media player device included in the plurality of media player devices;
   determining, by the stream management system in response to the request, that the DVR device is already receiving and recording a plurality of media streams provided by the television service when the request is detected and that a total number of media streams included in the plurality of media streams is equal to a maximum number of media streams that the DVR device is allowed to concurrently record;
   performing, by the stream management system in response to the determining that the DVR device is already receiving and recording the maximum number of media streams, a status check to determine whether each media stream included in the plurality of media streams is
      an active tune-in stream that is being presented by one of the media player devices when the request is detected and without a user input command being provided for the DVR device to record a media program included in the active tune-in stream,
      an inactive tune-in stream that is no longer being presented by any of the media player devices when the request is detected but that was being presented prior to the request by one of the media player devices without a user input command being provided for the DVR device to record a media program included in the inactive tune-in stream, or
      a recording stream that is being recorded by the DVR device when the request is detected and in response to a user input command being provided for the DVR device to record a media program included in the recording stream;
   wherein when the status check indicates that the plurality of media streams includes a plurality of active tune-in streams when the request is detected and that the plurality of media streams does not include any inactive tune-in streams when the request is detected, the method further comprises selecting, by the stream management system based on a priority-based selection heuristic, a particular active tune-in stream from the plurality of active tune-in streams, and directing, by the stream management system, the DVR device to drop the particular active tune-in stream and receive and record the media stream in place of the particular active tune-in stream.

2. The method of claim 1, wherein when the status check indicates that the plurality of media streams includes a particular inactive tune-in stream, the method further comprises directing, by the stream management system, the DVR device to drop the particular inactive tune-in stream and receive and record the media stream in place of the particular inactive tune-in stream.

3. The method of claim 1, wherein when the status check indicates that the plurality of media streams includes a plurality of inactive tune-in streams, the method further comprises:

identifying, by the stream management system, an inactive tune-in stream included in the plurality of inactive tune-in streams that has been inactive for more time than a remaining number of inactive tune-in streams included in the plurality of inactive tune-in streams; and directing, by the stream management system, the DVR device to drop the identified inactive tune-in stream and receive and record the media stream in place of the identified inactive tune-in stream.

4. The method of claim 1, wherein when the status check indicates that the plurality of media streams includes a plurality of inactive tune-in streams, the method further comprises:

determining, by the stream management system, an identity of a user that provides the request;

identifying, by the stream management system based on the identity of the user, an inactive tune-in stream included in the plurality of inactive tune-in streams and that is least likely of interest to the user; and directing, by the stream management system, the DVR device to drop the identified inactive tune-in stream and receive and record the media stream in place of the identified inactive tune-in stream.

5. The method of claim 1, wherein when the status check indicates that the plurality of media streams includes a plurality of inactive tune-in streams, the method further comprises:

determining, by the stream management system, that the request is for a particular media player device included in the plurality of media player devices to receive the media stream;

identifying, by the stream management system, an inactive tune-in stream included in the plurality of inactive tune-in streams and that was received by a different media player device included in the plurality of media player devices; and directing, by the stream management system, the DVR device to drop the identified inactive tune-in stream and receive and record the media stream in place of the identified inactive tune-in stream.

6. The method of claim 1, wherein when the status check indicates that the plurality of media streams includes only recording streams, the method further comprises directing, by the stream management system, the DVR device to continue recording the recording streams and abstain from receiving and recording the media stream.

7. The method of claim 6, further comprising providing, by the stream management system, a user notification that the DVR device is abstaining from receiving and recording the media stream.

8. The method of claim 1, wherein the selecting of the particular active tune-in stream from the plurality of active tune-in streams based on the priority-based selection heuristic comprises:

identifying an active tune-in stream included in the plurality of active tune-in streams and that includes less advertisement content than a remaining number of active tune-in streams included in the plurality of active tune-in streams; and designating the identified active tune-in stream as the particular active tune-in stream that is to be dropped by the DVR device.

9. The method of claim 1, wherein the selecting of the particular active tune-in stream from the plurality of active tune-in streams based on the priority-based selection heuristic comprises:

identifying an active tune-in stream included in the plurality of active tune-in streams that has been active for more time than a remaining number of active tune-in streams included in the plurality of active tune-in streams; and designating the identified active tune-in stream as the particular active tune-in stream that is to be dropped by the DVR device.

10. The method of claim 1, wherein the selecting of the particular active tune-in stream from the plurality of active tune-in streams based on the priority-based selection heuristic comprises:

identifying, by the stream management system, a user that provides the request;

identifying, by the stream management system based on the identity of the user, an active tune-in stream included in the plurality of active tune-in streams and that is least likely of interest to the user; and designating the identified active tune-in stream as the particular active tune-in stream that is to be dropped by the DVR device.

11. The method of claim 1, embodied as computer-executable instructions on at least one non-transitory computer-readable medium.

12. A system comprising:

at least one physical computing device that:

detects a request for any device included in a media processing system to receive a media stream provided by a television service, the media processing system comprising a plurality of media player devices and a digital video recording ("DVR") device separate from and communicatively coupled to the plurality of media player devices and configured to automatically receive and record media streams received by any media player device included in the plurality of media player devices;

determines, in response to the request, that the DVR device is already receiving and recording a plurality of media streams provided by the television service when the request is detected and that a total number of media streams included in the plurality of media streams is equal to a maximum number of media streams that the DVR device is allowed to concurrently record;

performs, in response to the determination that the DVR device is already receiving and recording the maximum number of media streams, a status check to determine whether each media stream included in the plurality of media streams is
- an active tune-in stream that is being presented by one of the media player devices when the request is detected and without a user input command being provided for the DVR device to record a media program included in the active tune-in stream,
- an inactive tune-in stream that is no longer being presented by any of the media player devices when the request is detected but that was being presented prior to the request by one of the media player devices without a user input command being provided for the DVR device to record a media program included in the inactive tune-in stream, or
- a recording stream that is being recorded by the DVR device when the request is detected and in response to a user input command being provided for the DVR device to record a media program included in the recording stream;

wherein when the status check indicates that the plurality of media streams includes a plurality of active tune-in streams when the request is detected and that the plurality of media streams does not include any inactive tune-in streams when the request is detected, the at least one physical computing device
- selects, based on a priority-based selection heuristic, a particular active tune-in stream from the plurality of active tune-in streams, and
- directs the DVR device to drop the particular active tune-in stream and receive and record the media stream in place of the particular active tune-in stream.

13. The system of claim 12, wherein when the status check indicates that the plurality of media streams includes a particular inactive tune-in stream, the at least one physical computing device directs the DVR device to drop the particular inactive tune-in stream and receive and record the media stream in place of the particular inactive tune-in stream.

14. The system of claim 12, wherein when the status check indicates that the plurality of media streams includes a plurality of inactive tune-in streams, the at least one physical computing device system:
- identifies an inactive tune-in stream included in the plurality of inactive tune-in streams that has been inactive for more time than a remaining number of inactive tune-in streams included in the plurality of inactive tune-in streams; and
- directs the DVR device to drop the identified inactive tune-in stream and receive and record the media stream in place of the identified inactive tune-in stream.

15. The system of claim 12, wherein when the status check indicates that the plurality of media streams includes a plurality of inactive tune-in streams, the system:
- determines an identity of a user that provides the request;
- identifies, based on the identity of the user, an inactive tune-in stream included in the plurality of inactive tune-in streams and that is least likely of interest to the user; and
- directs the DVR device to drop the identified inactive tune-in stream and receive and record the media stream in place of the identified inactive tune-in stream.

16. The system of claim 12, wherein when the status check indicates that the plurality of media streams includes only recording streams, the at least one physical computing device directs the DVR device to continue recording the recording streams and abstain from receiving and recording the media stream.

17. The system of claim 16, wherein the at least one physical computing device provides a user notification that the DVR device is abstaining from receiving and recording the media stream.

18. The system of claim 12, wherein the at least one physical computing device selects the particular active tune-in stream from the plurality of active tune-in streams based on the priority-based selection heuristic by:
- identifying an active tune-in stream included in the plurality of active tune-in streams and that includes less advertisement content than a remaining number of active tune-in streams included in the plurality of active tune-in streams; and
- designating the identified active tune-in stream as the particular active tune-in stream that is to be dropped by the DVR device.

* * * * *